United States Patent [19]
Kiel

[11] 3,766,986
[45] Oct. 23, 1973

[54] METHOD OF TREATING A WELL USING A VOLATILE HYDROCARBON LIQUID

[75] Inventor: Othar M. Kiel, Homeworth, Ohio

[73] Assignee: Esso Production Research Company, Houston, Tex.

[22] Filed: Aug. 18, 1972

[21] Appl. No.: 281,696

[52] U.S. Cl.................................. 166/308, 166/283
[51] Int. Cl.............................................. E21b 43/26
[58] Field of Search.................... 166/280, 308, 283; 252/8.55 R

[56] References Cited
UNITED STATES PATENTS

| | | | |
|---|---|---|---|
| 2,802,531 | 8/1957 | Cardwell et al.................. | 166/308 X |
| 3,108,636 | 10/1963 | Peterson............................ | 166/308 |
| 3,368,627 | 2/1968 | Hurst et al...................... | 166/308 X |
| 3,396,107 | 8/1968 | Hill................................. | 166/308 X |
| 3,405,762 | 10/1968 | Terwilliger......................... | 166/308 |
| 3,603,400 | 9/1971 | Son, Jr.............................. | 166/308 |
| 3,664,422 | 5/1972 | Bullen.............................. | 166/308 X |
| 3,710,865 | 1/1973 | Kiel................................... | 166/308 |
| 3,722,595 | 3/1973 | Kiel................................... | 166/308 |

*Primary Examiner*—Stephen J. Novosad
*Attorney*—James A. Reilly et al.

[57] ABSTRACT

A method for treating a subterranean formation surrounding a wellbore wherein a viscous aqueous liquid containing an emulsifying agent and suspended propping agent particles is mixed with a volatile hydrocarbon liquid at a pressure higher than the vapor pressure of the volatile hydrocarbon liquid, and thereafter the mixture is injected through the wellbore and into the formation under conditions to open a fracture in the formation.

19 Claims, 3 Drawing Figures ing volatile hydrocarbon liquid. The method can be employed in fracturing operations and also in other well treating operations wherein it is desired to transport and deposit a particulate material into or adjacent a producing formation. Its preferred application, however, will be in the fracturing of gas or condensate formations.

METHOD OF TREATING A WELL USING A VOLATILE HYDROCARBON LIQUID

BACKGROUND OF THE INVENTION

1. Field of the Invention

This invention relates to a well treating method which employs a volatile hydrocarbon liquid and suspended particulate material. In one aspect, it relates to the fracturing of subterranean formations surrounding oil wells, gas wells, and similar boreholes.

2. Description of the Prior Art

Stimulation of wells by the hydraulic fracturing technique normally involves the injection of a fracturing fluid into a subterranean formation at a rate and pressure sufficient to initiate and propagate a fracture therein, and the placement of propping agent particles in the fracture to prevent the formation from closing following the treatment. The propped fracture provides a highly conductive channel that extends from the wellbore deep into the formation.

A recent development in hydraulic fracturing techniques involves the use of volatile hydrocarbon liquid as the fracturing fluid. This technique has been advantageously employed in the stimulation of gas-producing formations. Its main benefit over fracturing techniques which employ a non-volatile liquid is that the volatile liquid, because of its low viscosity and tendency to vaporize into a highly mobile gas, may be readily removed from the formation following the fracturing treatment.

A problem associated with this technique, however, has been that of incorporating the propping agent particles into the volatile liquid. Since the volatile liquid must be maintained under pressure higher than its vapor pressure, the propping agent particles normally cannot be blended into the fluid using conventional equipment and techniques. One approach to the problem involves the use of a special blender which provides a closed system and permits the propping agent particles to be added under pressure. The pressurized blenders, however, are not readily available and are not always capable of blending the propping agent particles into the fluid at the desired concentration. Another approach involves the use of a viscous non-volatile liquid as a carrier liquid for the propping agent particles. Propping agent particles are first suspended in the nonvolatile carrier liquid forming a slurry which is then mixed with the volatile hydrocarbon liquid during injection operations. This technique, however, is normally restricted to relatively low concentration of the propping agent particles because of two factors: (1) the nonvolatile carrier liquid containing the propping agent particles normally constitutes a very minor volume proportion of the total fluid used; and (2) the commingling of the nonvolatile liquid and volatile liquid produces a fracturing fluid having a viscosity intermediate that of the viscous nonvolatile liquid and the volatile liquid. Thus, while the viscous nonvolatile liquid may be capable of suspending substantial amounts of propping agent, the mixed fluids, either because of the relatively small amount of the carrier fluid or because of the reduced viscosity, may not be capable of carrying high concentrations of the propping agent deep into the formation.

SUMMARY OF THE INVENTION

The present invention provides an improved method for introducing particulate material into a fluid containing volatile hydrocarbon liquid. The method can be employed in fracturing operations and also in other well treating operations wherein it is desired to transport and deposit a particulate material into or adjacent a producing formation. Its preferred application, however, will be in the fracturing of gas or condensate formations.

The method employs an emulsion wherein the external phase is a viscous aqueous liquid and the internal phase is a volatile hydrocarbon liquid such as propane, butane, pentane, liquefied petroleum gas, gas condensate having a vapor pressure higher than atmospheric pressure, or mixtures of these with nonvolatile hydrocarbons such as kerosene, diesel oil, light gas oil, and other light and middle distillates, as well as light crude oil and nonvolatile condensate. In one embodiment, the method involves blending, at atmospheric pressure, particulate material having a particle size between about 8 and about 100 mesh into a viscous aqueous liquid containing an emulsifying agent to form a slurry; mixing the slurry and volatile hydrocarbon liquid together, at a pressure above the vapor pressure of the hydrocarbon liquid, to form an emulsion wherein the viscous aqueous liquid comprises the external phase and the volatile hydrocarbon liquid comprises the internal phase; and injecting the emulsion into a well.

The viscous aqueous liquid constitutes between about 20 and about 80 volume percent, preferably between 20 and 50 volume percent, of the emulsion. Its apparent viscosity should be between about 10 centipoises and about 200 centipoises at 70°F and a shear rate of about 511 reciprocal seconds. This viscosity range permits the aqueous liquid to suspend relatively large quantities of particulate material. A water-soluble polymeric thickening agent such as natural or synthetic polymers may be employed to impart the desired viscosity to the aqueous liquid.

The concentration of the volatile hydrocarbon liquid in the emulsion comprises not more than 80 volume percent, and preferably between 50 and 80 volume percent, of the emulsion. The volatile hydrocarbon liquid at high concentrations combines with the viscous aqueous phase to produce an emulsion having an apparent viscosity substantially higher than that of the viscous aqueous liquid. The high viscosity of the emulsion permits the propping agent particles to be carried deep into the formation.

Another embodiment of the invention involves blending the viscous aqueous liquid and a nonvolatile hydrocarbon liquid together to form an oil-in-water emulsion. Particulate material is added to the emulsion to form a slurry which is then mixed with a volatile hydrocarbon liquid at a pressure above the vapor pressure of the volatile hydrocarbon liquid. The nonvolatile and volatile hydrocarbon liquids combine to provide the emulsion with between about 50 and 80 volume percent of an internal hydrocarbon phase. This emulsion is then injected into the well.

The nonvolatile liquid is preferably a light hydrocarbon liquid such as diesel oil, kerosene, light crude oil, and the like. In some treatments, a stabilized gas condensate may be employed as the nonvolatile hydrocarbon liquid.

A particularly advantageous feature of the present invention is that it permits the introduction of particulate material into a volatile well treating fluid using conventional blending equipment.

DESCRIPTION OF THE PREFERRED EMBODIMENTS

Figure 1:
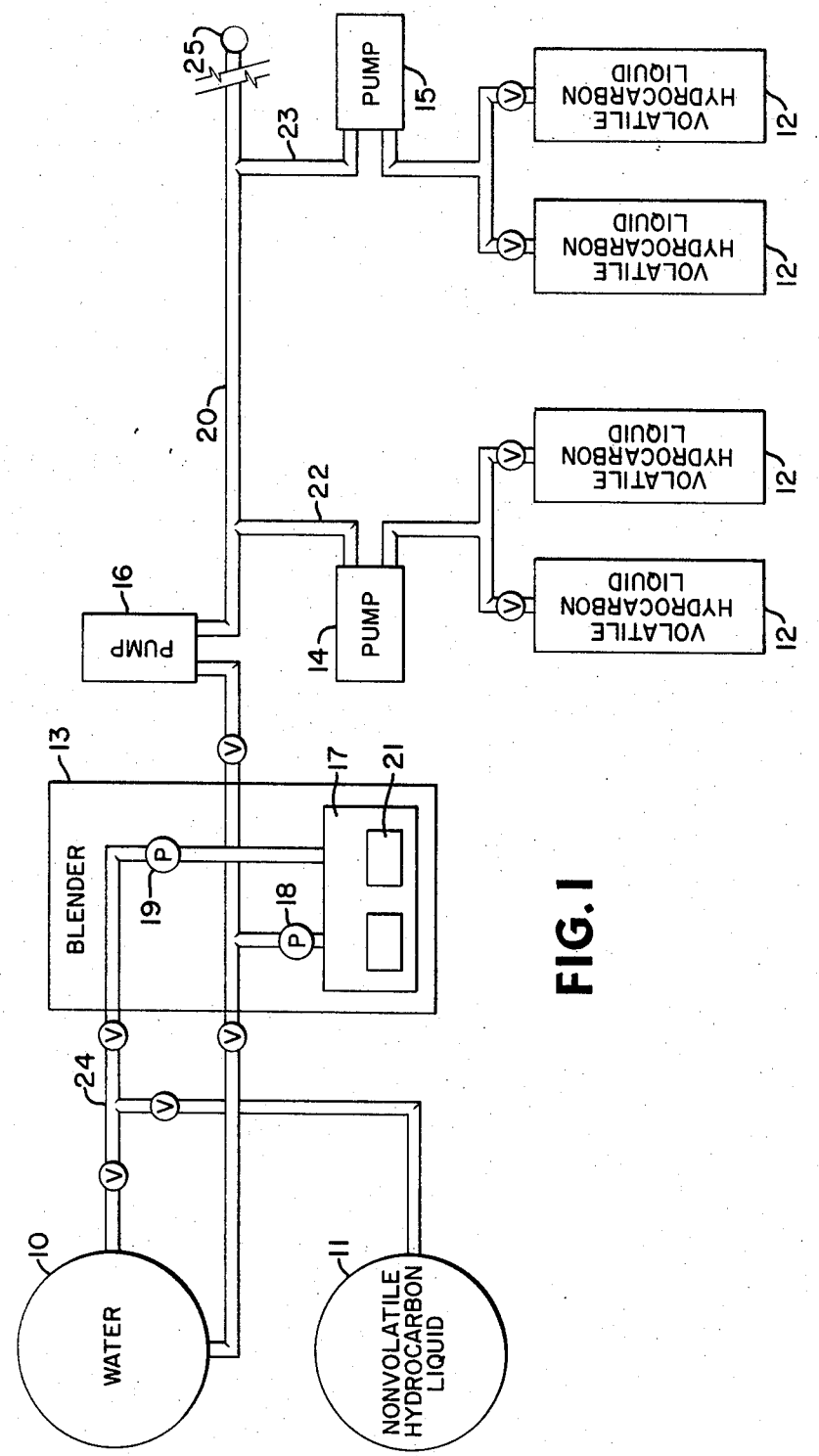
FIG. 1 is a schematic illustration of the preferred embodiment of equipment capable of performing the method of the present invention.

The method of the present invention employs an emulsion comprising an external aqueous phase and an internal hydrocarbon phase which includes a volatile hydrocarbon liquid. The aqueous phase will normally be water containing an effective amount of a water-soluble polymeric thickening agent to impart sufficient viscosity to the water to enable it to suspend particulate material. The water may be fresh water, water from a public water supply, sea water, salt water, or brine. When treating formations containing water-sensitive clays, salt water or brine is preferred. Suitable polymeric thickening agents include natural occurring materials such as cellulose derivatives and guar gum, and synthetic polymers such as polyacrylamide. The concentration of the polymeric thickening agent in the water should normally be sufficient to impart an apparent viscosity thereto of between about 10 centipoises and about 200 centipoises at 70°F and a shear rate of 511 reciprocal seconds. The concentration of the thickening agent in the aqueous liquid will normally be between about 0.1 and 1.0 weight percent.

A surface-active emulsifying agent capable of forming oil-in-water emulsions will also be included in the water to ensure that emulsification is complete before the mixed fluids are introduced into the formation. A wide variety of emulsifying agents capable of forming oil-in-water emulsions are available. These include anionic, cationic, and nonionic emulsifying agents having hydrophile-lipophile balance (HLB) values between about 8 and about 18. Suitable anionic emulsifying agents include the alkali, amine, and other carboxylic acid soaps. Suitable cationic emulsifying agents include amines of quaternary ammonium salts, aliphatic quaternary ammonium compounds, and the reaction product of an aliphatic quaternary ammonium compound with a water-soluble polysaccharide. Nonionic emulsifying agents capable of forming oil-in-water emulsions include polyoxyethylene sorbitan monolaurate, polyoxyethylene lauryl ether, polyoxyethylene monostearate, polyoxyethylene oxypropylene stearate, polyoxyethylene cetyl ether, polyoxyethylene sorbitan esters of mixed fatty acids and resin acids, polyoxyethylene glycol monopalmitate, and polyoxyethylene sorbitan monopalmitate. The concentration of the emulsifying agent in the water will normally be between about 0.1 weight percent and about 3.0 weight percent based on the weight of the aqueous phase.

When employing an anionic emulsifying agent which is sensitive to divalent ions, it will be necessary to use fresh water or softened hard water as the aqueous liquid. For many of the nonionic and cationic emulsifying agents, however, brine, salt water, or sea water may be employed.

The volatile hydrocarbon may be any hydrocarbon liquid that has a high vapor pressure higher than atmospheric pressure at surface conditions or one that contains volatile constituents. These include propane, butane, pentane, liquefied petroleum gas (LPG), gas condensate, or mixtures of these. The term "liquefied petroleum gas" refers to any material composed predominantly of propane, propylene, butane, butylene, and mixtures of these. With the exception of gas condensate and pentane, these liquids, because of their high vapor pressures, must be contained in pressure vessels. Gas condensate comprises the condensable hydrocarbon fractions produced from a gas or gas condensate well. Gas condensate, although not highly volatile, frequently contains volatile constituents which tend to vaporize slowly at atmospheric pressure. When employing condensate that contains volatile constituents or pentane at high surface temperatures, it is preferred to introduce these fluids into the system under pressure. Condensate that has been stabilized, however, may be employed as the nonvolatile hydrocarbon as, for example, in the manner described below.

The present invention provides a method for adding particulate material to a volatile hydrocarbon liquid using conventional blending equipment. In one embodiment, the particulate material is first suspended in the viscous aqueous liquid containing an emulsifying agent using blending equipment open to the atmosphere. The slurry produced by this operation is blended with the volatile hydrocarbon liquid at a pressure higher than the vapor pressure of the hydrocarbon liquid to form an emulsion. The emulsion containing the suspended particles is then injected into the well.

Particulate materials may include sand, plastic pellets, walnut shells, glass beads, metal beads, and the like. The particle size of most of these materials, particularly those used in fracturing operations, will be between about 8 and 100 mesh based on the U. S. Sieve Series. The concentration of the particles normally will be between about 1 and 6 pounds per gallon of the treating fluid.

As mentioned previously, the viscous aqueous liquid and a nonvolatile hydrocarbon may be emulsified prior to introducing the particulate material into the system. The concentration of the nonvolatile liquid in the emulsion will normally be no more than about 50 volume percent. Particulate material is added to the emulsion at atmospheric pressure to form a slurry. This slurry is then mixed with a volatile hydrocarbon liquid at a pressure higher than the vapor pressure of the volatile hydrocarbon liquid by flowing the two liquids together through a conduit. The addition of the volatile hydrocarbon liquid increases the concentration of the internal hydrocarbon phase, preferably to a level of between about 50 and 80 volume percent of the emulsion. The nonvolatile hydrocarbon liquid which can be kerosene, diesel oil, stabilized condensate, crude oil, or similar light hydrocarbon, aids the mixing procedure by increasing the viscosity of the liquid used to carry the particulate material. It also ensures that an emulsion is formed prior to introduction of the volatile hydrocarbon liquid. Tests have shown that the volatile hydrocarbon liquid can be blended into the emulsion of the aqueous liquid and nonvolatile hydrocarbon to increase the concentration of the hydrocarbon phase with very little agitation. The volatile hydrocarbon, preferably, constitutes at least 50 volume percent of the hydrocarbon phase.

As shown in FIG. 1, the equipment for performing the method includes a water tank 10, an oil tank 11, a blender 13, volatile hydrocarbon tanks 12, high pressure pumps 14, 15, and 16, and piping for interconnecting these components. The blender 13 may be conventional comprising a suction pump 19, a blender tub 17 open to the atmosphere, and a discharge pump 18. The blender tub 17 normally includes an agitator paddle and jets for dispersing fluid additives introduced through tub openings 21. The discharge of pump 16, through high pressure line 20, is connected to the wellhead 25. The tanks 12 containing the volatile hydrocarbon liquid are connected to separate pumps 14 and 15 which, through lines 22 and 23, are connected to high pressure line 20.

The water and oil tanks 10 and 11 may be steel tanks open to the atmosphere. Since the volume of water normally will be between about 20 and about 50 volume percent of the emulsion used to treat the formation, one 500-barrel water tank will be sufficient for most treatments. In the procedure that employs an emulsion of water and nonvolatile hydrocarbon liquid, two 500-barrel tanks will normally be sufficient.

The volatile hydrocarbon tanks 12 may be provided by the tank trucks used to transport the volatile hydrocarbon liquid to the well site. If the volatile liquid is to be used only with viscous water, the volume of volatile hydrocarbon liquid delivered to the well site should normally be sufficient to constitute a major volume portion of the emulsion fluid used to treat the well. This normally will require several of the pressurized tanks 12 which can be arranged in banked relation as illustrated in FIG. 1 wherein two tanks feed pump 14 and two tanks feed pump 15. If gas condensate is used as the volatile hydrocarbon, it may be placed in tanks open to the atmosphere. These tanks will be connected to high pressure pumps 14 and 15. When using gas condensate, it may be necessary to employ transfer pumps at each tank to pressure feed the high pressure pumps 14 and 15.

In treatments that employ viscous water, a nonvolatile hydrocarbon liquid, and a volatile hydrocarbon liquid, the tankage should normally be sufficient to contain about equal volumes of these liquids.

Equipment arrangements other than those described above are possible. For example, transfer pumps may be employed to pump the volatile hydrocarbon liquid and commingle it with the viscous water or emulsion at a location between the blender pump 18 and high pressure pumps 14, 15, and 16. In such an arrangement, the mixture of these liquids may be fed to all of the fracturing pumps 14, 15, and 16 through suitable piping. This arrangement is particularly useful when gas condensate is employed as the volatile hydrocarbon liquid.

In performing a hydraulic fracturing treatment, the equipment may be arranged as illustrated in FIG. 1. Water which can be water from a public water supply or salt water depending upon the type of emulsifying agents will first be delivered to the well site and transferred to water tank 10. The polymeric water thickening agent and emulsifying agent will then be introduced into the water using blender 13. The water may be circulated through the blender 13 and returned to tank 10 while the polymeric thickening agent and emulsifying agent are introduced into the fluid system through openings 21 of the blender tub 17. Other additives such as a water softener or salt may also be added to the water using blender 13. Following the addition of the additives, the water in tank 10 will normally be permitted to set for a short period of time, usually about 30 minutes, to permit the additives to completely dissolve or hydrolyze.

After the water in tank 10 has been properly treated, and following pressure testing of the equipment, pumping operations may commence. Water from tank 10 is flowed through the blender 13 and to the suction of pump 16. Pump 16 pumps the water at fracturing pressure through high pressure line 20. Simultaneously with this operation, the volatile hydrocarbon liquid is pumped by pumps 14 and 15 and blended into the water flowing through line 20. The water and hydrocarbon liquid combine to form an emulsion which is injected through the wellbore and into the formation. Preferably, the volatile hydrocarbon liquid is introduced into line 20 at a plurality of locations to increase the concentration of the hydrocarbon phase in increments. The rates at which the water and volatile hydrocarbon liquid are pumped and combined are sufficiently high to open a fracture in the formation. The pumping rate will normally be between about 5 and 30 barrels per minute. Propping agent particles normally will not be introduced into the fluid until a fracture of sufficient dynamic geometry has been created to permit the entry of the propping agent particles. During this initial operation, however, it may be desirable to add a fluid loss additive such as silica flour to the fracturing fluid. This may be done by introducing the silica flour into the blender tub 17 through openings 21. From about 10 to about 60 pounds of the fluid loss additive per 1,000 gallons of the fracturing fluid are used in most treatments. The pumps 14, 15, and 16 are operated to provide the proper water-to-hydrocarbon liquid volume ratio which preferably will be between 1:1 and 1:4. After a fracture of the desired dynamic geometry has been created, the propping agent particles are blended into the viscous water by introducing them through openings 21 of blender tub 17. The concentration of the propping agent particles in the viscous water should be sufficiently high to provide the proper concentration in the total fracturing fluid. In a typical treatment wherein the volume ratio of water-to-volatile hydrocarbon is 1:2, the concentration of the propping agent particles in the water should be about three times that desired for the total fracturing fluid. Thus, if it is desired to provide the treating fluid with 3 pounds of propping agent per gallon of the emulsion, the propping agent particles will be added to the viscous water in a concentration of about 9 pounds per gallon. The slurry of viscous water and propping agent particles and the volatile hydrocarbon liquid are flowed together in line 20. The water and hydrocarbon liquid combine to form an emulsion and the propping agent particles become dispersed in the emulsion. The emulsion has an apparent viscosity substantially higher than that of the viscous water. The high viscosity of the emulsion permits the propping agent particles to be carried deep into the fracture. The emulsion containing the propping agent particles may be followed with an afterflush liquid to displace it from the wellbore. A volatile hydrocarbon liquid or lease condensate may be used for this purpose. Following pumping operations, the well is shut in to permit the emulsion to bleed off into the formation causing the fracture to close on the propping agent particles.

When the well is placed on production, the volatile hydrocarbon liquid tends to vaporize at formation conditions, particularly in the vicinity of the wellbore where the pressure has been reduced. The vaporization may be aided by formation gas commingling with the volatile hydrocarbon liquid in the fracture or formation matrix. The volatile hydrocarbon liquid also aids in the production operation by reducing the hydrostatic pressure within the wellbore. When the well is placed on production, the fracturing fluid remaining in the wellbore will vaporize, reducing the fluid column above the producing formation, and thereby induce the well to flow. This is an important feature when treating low pressure gas-producing formations.

The method embodiment that employs an emulsion of water and a nonvolatile hydrocarbon liquid is basically the same as that described above except that the viscous water and nonvolatile hydrocarbon are emulsified prior to introducing the propping agent particles. Emulsification of these liquids may be performed by flowing the liquids together as at 24 and then flowing this mixture through the blender 13. The mixture may be recirculated to tank 11 until the nonvolatile hydrocarbon is uniformly dispersed in the water. Alternatively, it may be flowed directly from the blender 13 to the high pressure pump 16. Volatile hydrocarbon liquid is added to the emulsion in line 20 by means of pump 14 and/or pump 15.

Variations in the treatement described above include using, in lieu of the emulsion to initiate and propagate the fracture, a separate fluid such as a gelled hydrocarbon for this purpose. This fluid may be injected into the formation to initiate and generate the fracture and may be followed with the emulsion containing the propping agent particles and the volatile hydrocarbon liquid.

From the foregoing, it will be apparent that numerous variations in the fluid formulation, fluid additives, and injection procedures are possible. A typical treatment, however, may be as follows. Five hundred barrels of water are placed in tank 10. Four high pressure vessels containing a total of about 1,200 barrels of a commercial LPG are connected to high pressure pumps 14 and 15. About 100 gallons of an emulsifying agent and about 1,000 pounds of guar gum are added to and dispersed in the water. The viscous water is pumped through high pressure line 20 while LPG is blended therein to provide a water-to-LPG volume ratio of about 1:2. During this initial pumping stage, a fluid loss additive is blended into the viscous water at a concentration of about 60 pounds per 1,000 gallons. About 750 barrels of the viscous water and LPG mixture are injected into the well at maximum permissible rates to initiate and propagate a fracture in the formation. Immediately following this and while continuing pumping at about the same volumetic rates, a 20–40 mesh sand is blended into the viscous water at a concentration of about 9 pounds per gallon. During this stage, the fluid loss additive is not used. The viscous water and sand slurry mix with the LPG in line 20 and the sand disperses in the mixture in a concentration of about 3 pound per gallon. About 750 barrels of the viscous water and LPG mixture containing the same are injected into the well to displace the emulsion from the wellbore. The well is then shut in to permit the emulsion to bleed off into the formation which causes the fracture to close on the propping agent particles. If desired, a spacer fluid consisting of the emulsion free of any suspended solids may be used between the emulsion containing the fluid loss additive and the emulsion containing the propping agent particles.

A series of laboratory tests were conducted to determine the rheological properties of an emulsion containing volatile hydrocarbon liquid. Samples were prepared by the following procedure. An emulsifier and guar gum were first added to brine (saturated NaCl solution) to form thicknened water. The emulsifier was a long chain quarternary ammonium chloride marketed by Enjay Chemical as a cationic emulsifier under the tradename "Corexit 8596." The thickened water had an apparent viscosity of about 47 centipoises at 70°F and a shear rate of 511 reciprocal seconds. Using a lucite pressure cell, n-butane or a mixture of n-butane and No. 2 diessel oil was then emulsified in the thickened water under a pressure of about 20 psig. When using a mixture of n-butane and diesel oil as the hydrocarbon phase, the brine and diesel oil were first emulsified and the n-butane added to this emulsion under pressure. Emulsification of all samples was rapid requiring only a few shakes of the pressure cell to disperse the hydrocarbon liquid in the brine. Each emulsion sample was cooled to a vapor pressure below atmospheric pressure and transferred to a Fann Model 50 B Viscometer which had been chilled to minimize flashing of the sample. The sample in the viscometer was pressurized with dry nitrogen and shear stress versus shear rate curve was recorded at various temperatures. The apparent viscosity versus shear rate curve was then plotted for each measurement.

Figure 2:
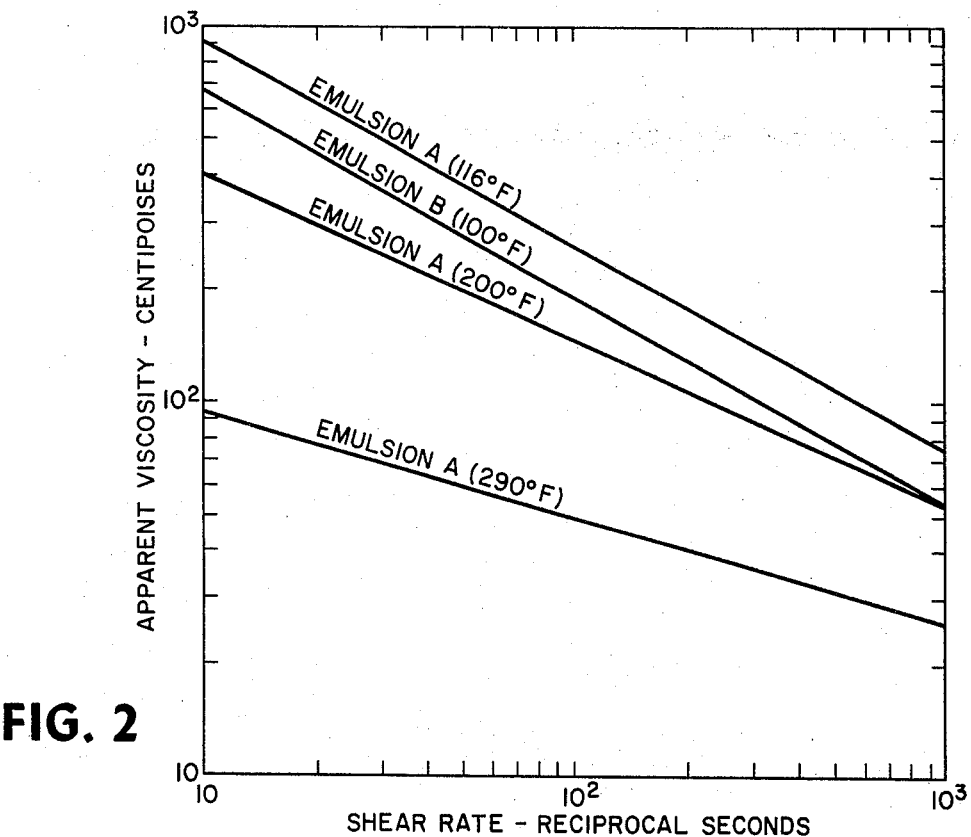
FIGS. 2 and 3 are plots of viscosity versus shear rate for various fluids useable in the method of the present invention.
Figure 3:
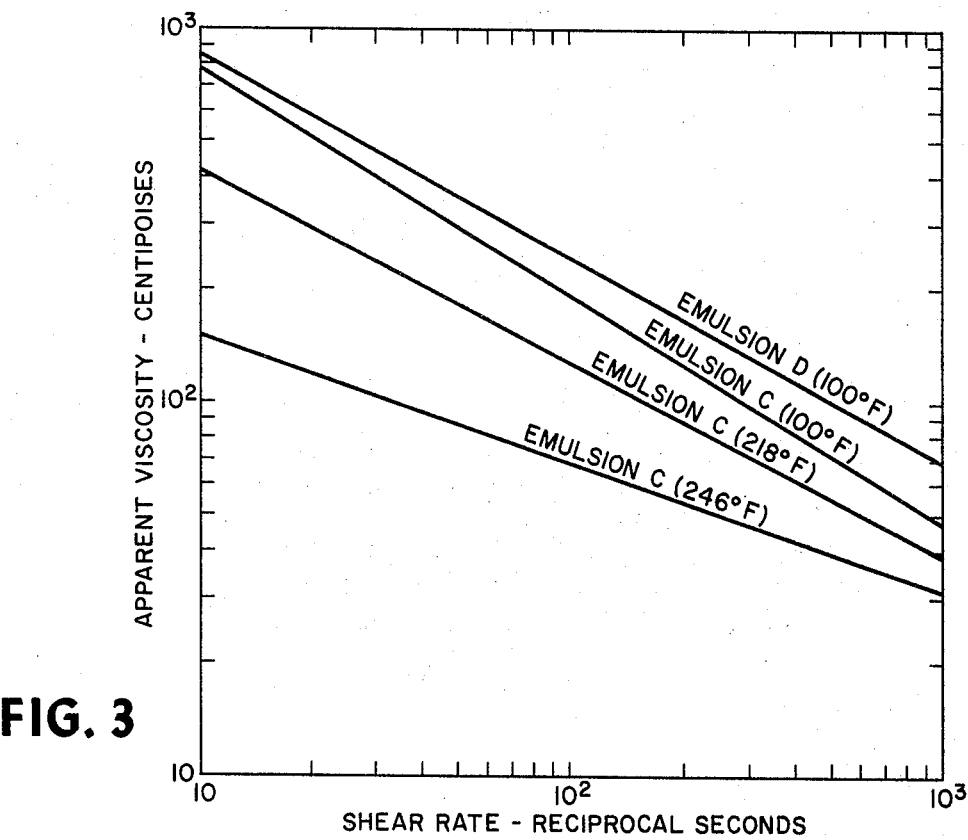

FIGS. 2 and 3 present apparent viscosity versus shear rate data for the various emulsions tested. The emulsions tested, identified as A, B, C, and D on the plots, had the following compositions.

|  | Emulsion A | Emulsion B | Emulsion C | Emulsion D |
|---|---|---|---|---|
| Aqueous phase: | | | | |
| Brine, vol. percent of emulsion | 33 | 50 | 33 | 25 |
| Emulsifier, wt. percent in brine | 0.42 | 0.42 | 0.42 | 0.42 |
| Guar gum, wt. percent in brine | 0.48 | 0.48 | 0.48 | 0.48 |
| Hydrocarbon phase: | | | | |
| n-Butane, vol. percent of emulsion | 33 |  | 67 | 50 |
| Diesel oil, vol. percent of emulsion | 34 | 50 |  | 25 |

The above laboratory experiments demonstrate that a volatile hydrocarbon liquid either alone or with a nonvolatile hydrocarbon can be emulsified readily in water containing an emulsifying agent and a thickening agent. Moreover, the emulsions are stable at relatively high temperatures.

In regard to the present invention relating to the addition of particulate material to an emulsion containing a volatile hydrocarbon liquid, it should be noted that the apparent viscosity of the final emulsion is substantially higher than that of the aqueous phase alone. It should also be noted that the addition of n-butane to an emulsion of diesel oil and brine increases the viscosity of the emulsion (compare Emulsion A and Emulsion B). This increase in viscosity is particularly important in fracturng operations because high apparent viscosity permit the propping agent particles to be transported deep into the fracture.

I claim:

1. A method for treating a well using a fluid containing a volatile hydrocarbon liquid which comprises blending into a viscous aqueous liquid containing an emulsifying agent capable of forming an oil-in-water emulsion, particulate material having a particle size between about 8 and about 100 mesh to form a slurry; mixing said slurry and said volatile hydrocarbon liquid together at a pressure above the vapor pressure of said volatile hydrocarbon liquid to form an emulsion wherein the viscous aqueous liquid comprises the external phase and constitutes at least 20 volume percent of the emulsion and the volatile hydrocarbon liquid comprises the internal phase and constitutes no more than about 80 volume percent of the emulsion; and injecting said emulsion into said well.

2. A method as defined in claim 1 wherein the particulate material is blended into said viscous aqueous liquid at atmospheric pressure.

3. A method as defined in claim 1 wherein the amount of particulate material blended into said viscous aqueous liquid is sufficient to provide a concentration of between about 1 and 6 pounds of said particulate material per gallon of said emulsion.

4. A method as defined in claim 1 wherein said volatile hydrocarbon liquid is propane.

5. A method as defined in claim 1 wherein said volatile hydrocarbon liquid is butane.

6. A method as defined in claim 1 wherein said volatile hydrocarbon liquid is liquid petroleum gas.

7. A method as defined in claim 1 wherein said viscous aqueous liquid has an apparent viscosity between about 10 and about 200 centipoises at 70°F and a shear rate of about 511 reciprocal seconds.

8. A method as defined in claim 7 wherein said viscous aqueous liquid comprises water containing a water-soluble polymeric thickening agent.

9. A method as defined in claim 8 wherein the polymeric thickening agent is polyacrylamide.

10. A method as defined in claim 8 wherein the polymeric thickening agent is guar gum.

11. A method as defined in claim 1 wherein the concentration of the volatile hydrocarbon liquid in the emulsion is between about 50 volume percent and about 80 volume percent.

12. A method of treating a well which comprises blending together a nonvolatile hydrocarbon liquid and a viscous aqueous liquid containing an emulsifying agent to form an emulsion wherein the viscous aqueous liquid comprises the external phase and the nonvolatile hydrocarbon liquid comprises the internal phase; blending into said emulsion particulate material having a particle size between about 8 and about 100 mesh to form a slurry; mixing said slurry and a volatile hydrocarbon liquid together at a pressure above the vapor pressure of said volatile hydrocarbon liquid to increase the concentration of said hydrocarbon phase of said emulsion to between about 50 and about 80 volume percent; and thereafter injecting said emulsion containing said volatile hydrocarbon and said particulate material into said well.

13. A method as defined in claim 12 wherein said nonvolatile hydrocarbon liquid comprises not more than about 50 volume percent of the emulsion of said viscous aqueous liquid and said nonvolatile hydrocarbon liquid.

14. A method as defined in claim 12 wherein said volatile hydrocarbon liquid comprises at least 50 volume percent of said hydrocarbon phase.

15. A method as defined in claim 12 wherein said nonvolatile hydrocarbon liquid is a gas condenste.

16. A method for the hydraulic fracturing of a subterranean formation surrounding a wellbore using a volatile hydrocarbon liquid which comprises blending into a viscous aqueous liquid containing an emulsifying agent capable of forming an oil-in-water emulsion, propping agent particles having a particle size between about 8 and about 100 mesh to form a slurry; flowing said slurry at a pressure above the vapor pressure of said hydrocarbon liquid through a conduit; commingling said volatile hydrocarbon liquid with said slurry in said conduit to form an emulsion wherein the viscous aqueous liquid comprises the external phase and constitutes at least 20 volume percent of the emulsion and the volatile hydrocarbon liquid comprises the internal phase and constitutes no more than 80 volume percent of the emulsion; and injecting said emulsion into said wellbore at a pressure sufficient to open a fracture in said formation.

17. A method for the hydraulic fracturing of a subterranean formation surrounding a wellbore using a volatile hydrocarbon liquid which comprises forming an emulsion which includes a viscous aqueous liquid as the external phase and a nonvolatile hydrocarbon as the internal phase; suspending in said emulsion propping agent particles having a particle size between about 8 and 100 mesh, flowing said emulsion containing the suspended propping agent particles through a conduit at a pressure above the vapor pressure of said volatile hydrocarbon liquid; introducing into said conduit said volatile hydrocarbon liquid to increase the concentration of said hydrocarbon phase of said emulsion to between about 50 and about 80 volume percent, and thereafter injecting said emulsion containing said volatile hydrocarbon liquid and said suspended propping agent particles into said formation at a pressure sufficient to open a fracture in said formation.

18. A method for the hydraulic fracturing of a subterranean formation surrounding a wellbore using a volatile hydrocarbon liquid which comprises blending into a viscous aqueous liquid containing an emulsifying agent capable of forming an oil-in-water emulsion propping agent particles to form a slurry, pumping said slurry through a conduit and into said wellbore at a pressure above the vapor pressure of said volatile hydrocarbon liquid, said pressure bieng sufficient to open a fracture in said formation; and commingling with said slurry flowing through said conduit said volatile hydrocarbon liquid to form an emulsion wherein the viscous aqueous liquid comprises the external phase and constitutes at least 20 volume percent of the emulsion and said volatile hydrocarbon liquid comprises the internal phase and constitutes no more than 80 volume percent of the emulsion.

19. A method for the hydraulic fracturing of a subterranean formation surrounding a wellbore using a volatile hydrocarbon liquid which comprises forming an emulsion which includes a viscous aqueous liquid as the external phase and a nonvolatile hydrocarbon liquid as the internal hydrocarbon phase; blending propping agent particles into said emulsion to form a slurry; pumping said slurry through a conduit and into said wellbore at a pressure sufficient to open a fracture in said formation, said pressure being above the vapor pressure of said volatile hydrocarbon liquid; introducing said volatile hydrocarbon liquid into said conduit to mix with said emulsion and thereby increase the concentration of said internal hydrocarbon phase of said emulsion to between about 50 and about 80 volume percent.

* * * * *